No. 807,042. PATENTED DEC. 12, 1905.
O. H. NEIMAN.
DRIVING MECHANISM.
APPLICATION FILED MAY 16, 1905.
FIG_1_
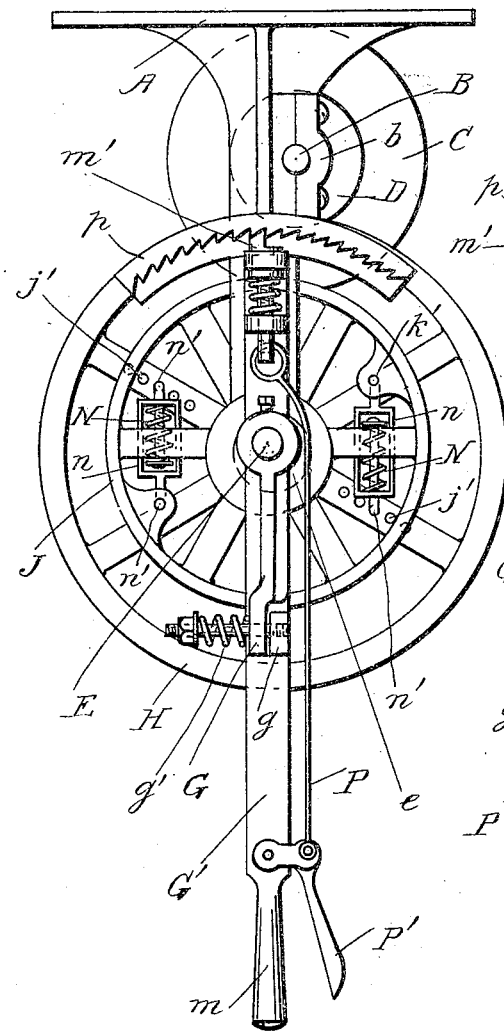
FIG_2_
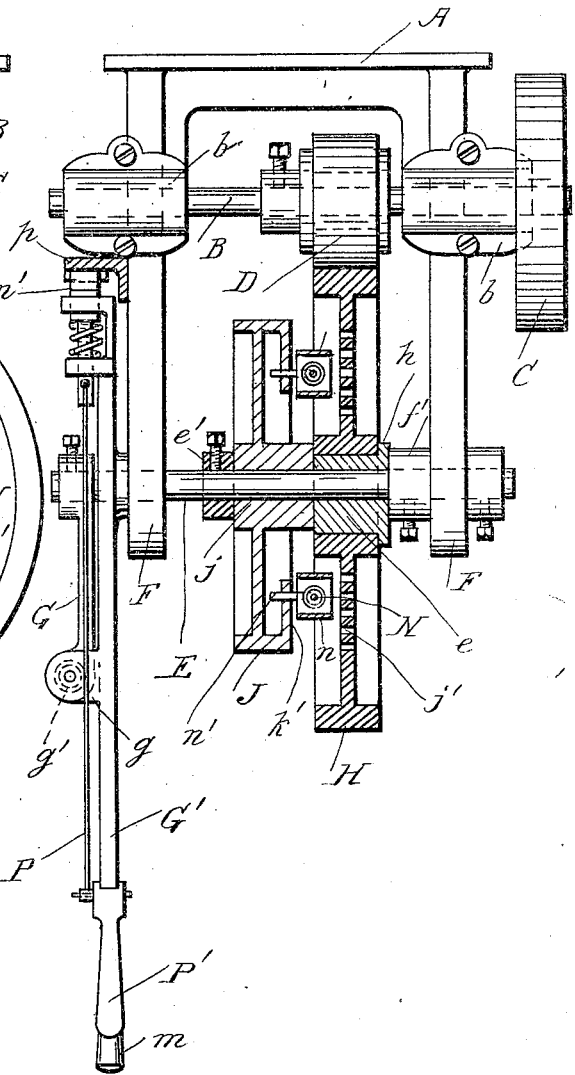
WITNESSES:
J. Smgg Poole
Robt. R. Ciuel
INVENTOR
Oscar H. Neiman
BY Herbert W. T. Jenner
Attorney.

UNITED STATES PATENT OFFICE.

OSCAR HERMANN NEIMAN, OF FREEPORT, ILLINOIS.

DRIVING MECHANISM.

No. 807,042.   Specification of Letters Patent.   Patented Dec. 12, 1905.

Application filed May 16, 1905. Serial No. 260,715.

*To all whom it may concern:*

Be it known that I, OSCAR HERMANN NEIMAN, a citizen of the United States, residing at Freeport, in the county of Stephenson and State of Illinois, have invented certain new and useful Improvements in Driving Mechanism; and I do hereby declare the following to be a full, clear, and exact description of the invention, such as will enable others skilled in the art to which it appertains to make and use the same.

This invention relates to driving mechanism for the transmission of power; and it consists in the novel construction and combination of the parts hereinafter fully described and claimed.

In the drawings, Figure 1 is a side view of the driving mechanism. Fig. 2 is a front view of the driving mechanism partly in section.

A is a supporting-frame of any approved construction.

B is the driving-shaft, which is journaled in stationary bearings $b$ on the frame A, and C is a driving-pulley or other equivalent driving device which is secured upon the shaft B.

D is a friction-pinion which is secured upon the shaft B. This friction pinion or driver is preferably formed of paper or straw; but it may be of any other approved material in carrying out this invention.

E is a shaft which is preferably arranged below the shaft B, and $e$ is an eccentric which is secured upon the shaft E. The shaft E is mounted in bearings F on the frame A, so that the two shafts B and E are parallel with each other. The shaft E is prevented from sliding endwise by a collar $f'$ or other suitable means and is free to oscillate in its bearings.

H is a friction-wheel which is journaled on the eccentric $e$ between a shoulder $h$ on the said eccentric and the hub of the driving-pulley J.

The friction-wheel H is preferably formed of metal; but it may be made of or faced with any other approved material. The friction-wheel and its driver or pinion are preferably formed with flat faces, which are pressed into driving contact with each other; but they may have beveled faces or their faces may be grooved or corrugated in any approved manner in carrying out this invention.

J is the driving-pulley, provided with a hub $j$, which is journaled loosely on the shaft E and which is prevented from sliding endwise by the eccentric $e$ and a collar $e'$.

The arms of the friction-wheel H are provided with radial series of holes $j''$, and the driving-pulley J is provided with perforated lugs having holes or perforations $k'$.

N represents spiral springs which are arranged between the friction-wheel H and the pulley J. These springs are mounted on any suitable supports or carriers $n$, and $n'$ represents pins at the ends of the spring-carriers, which engage with the holes $j''$ and $k'$, so that a yielding spring connection is formed between the friction-wheel H and the driving-pulley J or its equivalent driving device. The spring-supports can be connected with any of the holes $j''$, so as to vary the sensitiveness of the devices and enable them to work to the best advantage.

An arm G is secured on one end portion of the shaft E, and an operating-arm G' is mounted loose on the said shaft between the hub of the arm G and the adjacent shaft-bearing. The arm G' is provided with an operating-handle $m$ at one end, and it has a spring-actuated catch $m'$ at its other end which engages with a toothed segment $p$, secured to the frame A.

P is a trigger-rod for retracting the catch $m'$. The handle affords a means for moving the friction-wheel into and out of engagement with the friction pinion or driver when the trigger P' is pressed to actuate the trigger-rod and release the catch, and the toothed segment holds the parts in any desired position when the catch is engaged with it.

The arm G' has a projecting lug $g$, which overlaps a lug on the end of the arm G, and $g'$ is a spring connection between the two said lugs.

This driving mechanism is specially intended for use in connection with high-speed machines—such as cream-separators, which are usually driven by gas-engines. It may, however, be used in connection with any other machinery to which it can be applied. The spring connections N absorb the shocks due to the irregular action of the gas-engine or other motor, and they relieve the driven machinery from sudden strains to which it is sometimes subjected. The spring connection $g'$ also guards against shock and enables the devices to be used more effectively.

The driven machinery can be started as slowly as required with the motor going at full speed by means of the hereinbefore-described driving mechanism, and sudden shock due to sudden starting is therefore eliminated and the machinery is driven with great regularity.

What I claim is—

1. In a driving mechanism, the combination, with a pair of friction-wheels, and means for revolving one of them; of a driving device, a spring connection having its ends pivoted to the said driving device and to the other one of the said friction-wheels respectively and yielding when the said friction-wheels are placed in motion, and means for pressing the said friction-wheels into driving contact.

2. In a driving mechanism, the combination, with a pair of friction-wheels, and means for revolving one of them; of a driving device, a carrier provided with a spiral spring and having its end portions connected to the said driving device and to the other said friction-wheel respectively, and means for pressing the said friction-wheels into driving contact.

3. In a driving mechanism, the combination, with a supporting-frame, a friction-pinion journaled in the said frame, and means for revolving the said pinion; of a shaft mounted in the said frame, an eccentric secured on the said shaft, a friction-wheel journaled on the said eccentric, a handle provided with catch mechanism and connected to the said shaft and operating to hold the said friction-wheel in contact with the said friction-pinion, a driving device journaled on the said shaft, and a spring connection between the said friction-wheel and driving device.

4. In a driving mechanism, the combination, with a supporting-frame, a friction-pinion journaled in the said frame, and means for revolving the said pinion; of a shaft mounted in the said frame, an eccentric secured on the said shaft, a friction-wheel journaled on the said eccentric, a driving-pulley journaled on the said shaft, a spring connection between the said friction-wheel and driving-pulley, an arm secured to the said shaft, an operating-arm mounted on the said shaft and provided with catch mechanism for connecting it with the said frame, and a spring connection between the two said arms.

In testimony whereof I have affixed my signature in the presence of two witnesses.

OSCAR HERMANN NEIMAN.

Witnesses:
   DOUGLAS PATTISON,
   C. RAME.